Oct. 3, 1950 E. N. STORRS 2,524,405
MOUNT SUPPORT
Filed Sept. 22, 1947

INVENTOR
Ernest N. Storrs
BY
ATTORNEY

Patented Oct. 3, 1950

2,524,405

UNITED STATES PATENT OFFICE 2,524,405

MOUNT SUPPORT

Ernest N. Storrs, Asbury Park, N. J.

Application September 22, 1947, Serial No. 775,402

5 Claims. (Cl. 248—358)

This invention relates to vibration and shock mounts, and particularly to a combination viscous and resilient type of shock mount having non-resonant properties.

Vibration mounts using rubber bonded to a support and to a load to be supported are well-known, as evidenced by Lord U. S. Patent No. 2,019,052 of October 29, 1935, while a combination type of mount utilizing rubber and a fluid is described in Harding U. S. Patent No. 2,387,066 of October 16, 1945. It is well-known that certain types of all rubber shock absorbers have a natural period of resonance which may amplify the energy being applied when the external force is at a frequency near the resonant period of the mount. Many times this creates a larger destructive force than that of the applied force. To correct this condition, the viscous damped type of mount has been suggested, and the invention described hereinafter utilizes this form of damping. One form of mount of the invention provides an equal reaction to external forces applied in either direction, while another type provides unequal reactions to such forces.

The present invention, therefore, embodies in a simple, economical structure both resilient and viscous damping, together with a reaction differential to external forces tending to move it in different directions. It is particularly suitable for use on automobiles wherein a comparatively small resistance is desired to movement in one direction and a large resistance to the restoring movement is desired in the reverse direction. The resilient portion of the mount may be placed in simple sheer, or in torsional sheer, which permits of a slight lateral movement.

The principal object of the invention, therefore, is to facilitate the vibration or shock proofing of an element from external forces.

Another object of the invention is to provide an improved vibration and shock mount.

A further object of the invention is to provide a vibration and shock mount having resilient and viscous damping with a differential reaction to external forces according to the direction of application of the forces.

A still further object of the invention is to provide a vibration mount including resilient material, viscous fluid, and a valve to provide a differential reaction to external forces.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
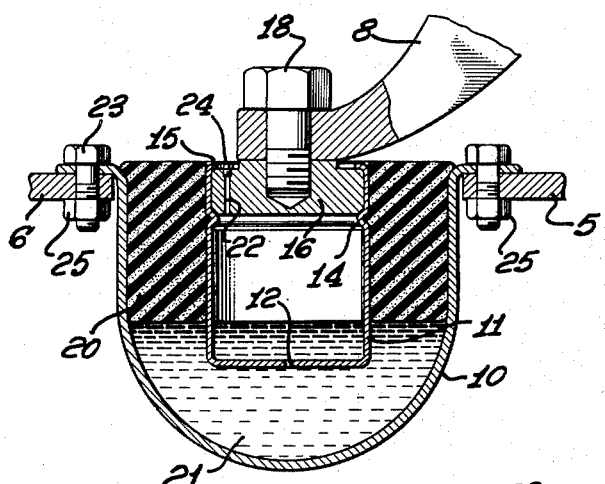
Fig. 1 is a cross-sectional view of one modification of the invention.

Referring now to the drawings, in which the same numerals identify like elements, the mount is attached to a frame, shown partially at 5 and 6, which may be stationary or movable, depending upon the element to be insulated from shock. Bolts 23 pass through holes in the members 5 and 6 and the mount, and are held by nuts 25. Another element, which may be fixed or be shock proofed from the elements 5 and 6, may be connected to an arm 8. Although the load to be shock proofed is usually attached to arm 8, it is to be understood that the mount may be used between any two elements, either one of which is to be insulated from movements of the other element. The mount itself consists of a cylindrical bowl type casing 10 with an internal cylindrical shell 11 having a small opening at the center of the bottom thereof, as shown at 12. Toward the upper rim of the shell is an annular detent 14, between which and a spun rim 15 is a mounting collar 16 into which is threaded a bolt 18 which fastens the arm 8 to the collar 16. Bonded between the inner, upper surface of the casing 10 and the outer, upper surface of the shell 11, is an annular ring of resilient material 20, such as rubber. In the space between the ring 20 and casing 10, and within the shell 11 to approximately the level of the bottom surface of the ring 20, is a viscous fluid, such as oil 21. The oil is introduced through the opening 22 in the collar 16, which is then closed by a ventilated cap 24.

When a downward thrust is applied to the arm 8, the shell 11 moves downwardly due to the resiliency of the rubber 20, the oil being compressed. The oil will thus be forced upwardly through the opening 12 at a rate determined by the force of the downward thrust, the size of the opening 12, the viscosity of the oil, and the compressibility of the air within the shell 11. When the force is removed, the resiliency of the rubber 20 tends to restore the shell 11 to its normal position, and the rate of movement of the shell is controlled by the passage of the oil 21 back through the opening 12. The mount is thus non-resonant, while the stiffness is determined by the stiffness of the rubber 20 and the size of the opening 12. These two elements may, therefore, be varied in accordance with the nature of the load to be shock proofed.

Figure 2:
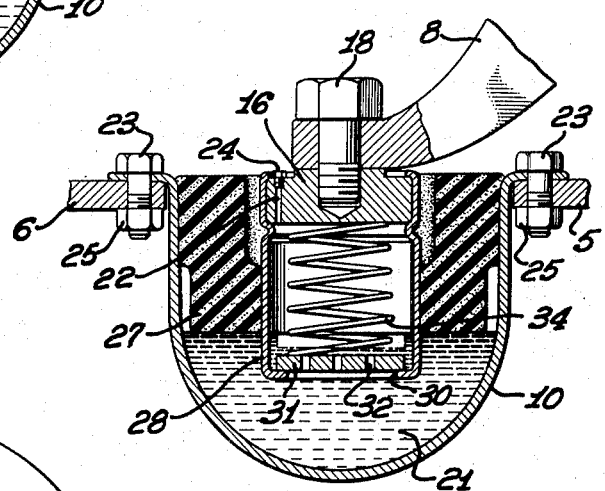
Fig. 2 is a cross-sectional view of a second modification of the invention.
Figure 3:
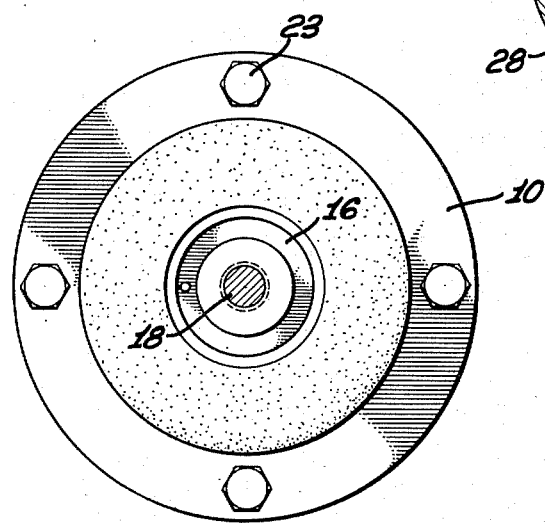
Fig. 3 is a plan view of the modification shown in Fig. 1, a plan view of the modification shown in Fig. 2 being substantially the same.

Referring now to Fig. 2, in which a modification of the mount shown in Fig. 1 is illustrated, and one which has substantially the same plan view as the modification shown in Fig. 1 (see Fig. 3), the members 5 and 6 and arm 8 are attached to the casing 10 and disc 16 in the same manner as in Fig. 1. In this modification, however, resilient element 20 of Fig. 1 is now in a Z-form, as shown at 27, wherein the upper half of the rubber is bonded to the inner surface of the casing 10 and the lower portion of the rubber 27 is attached to the outer surface of the shell 28. This type of resilient support permits of movement of the shell 28 within the casing 10 in all directions to a limited extent determined by the physical dimensions of the mount, and thereby provides a more flexible and softer reaction to external forces applied to either of the elements 5 or 6 or the arm 8.

Another difference between the two modifications is that the shell 28 in Fig. 2 has a large opening 30 in the bottom thereof upon which is seated a piston element 31 having a plurality of small openings 32 therein. The piston 31 is not attached in any manner to the shell 28, and will move upwardly upon a downward thrust of the shell or any relative movement of the shell 28 toward the casing 10. This action forces the fluid 21 upwardly into the shell 28 very rapidly, since it may pass not only through the openings 32, but also between the rim of the piston 31 and the inner surface of the shell. However, when the shell and casing tend to separate, the piston 31 is immediately returned to its seat, which may be solely by gravity or with the additional aid of a compression spring 34. The oil entrapped within the shell 28 must now return to the bottom of the casing 10 through the small openings 32 which will offer a greater resistance to the separation of the shell and casing. In this manner, a much smaller resistance is obtained to the bringing of the shell and casing 10 together than to that provided when the shell and casing are separated.

To further illustrate, if the elements 5 and 6 were attached to a motor vehicle frame and the arm 8 to delicate apparatus being transported thereby, then upon encountering road irregularities, the frame could move upwardly much more freely than it could move downwardly. Accordingly, the upward movement will minimize destructive thrust communicated to the delicate apparatus, while the downward movement will damp out the counter force. The oil eliminates resonance from the mount, while the movable piston functions to provide a differential in the reaction of the external forces from different directions. The device is simple, economical to construct, and easy to maintain in good operating condition.

I claim:
1. A mount for supporting a load subject to vibration and shock, comprising a member to be fixed to said load and having axial movement, a supporting element adapted to be secured to a fixed support, a viscous damping fluid in said supporting element, a hollow element within said supporting element and attached to said member having axial movement and having an opening at one end thereof to permit entrance of said fluid into said hollow element, resilient material for interconnecting said hollow element and said supporting element, said resilient element having a Z-shape to permit substantially free motion of said load in all directions to a predetermined extent.

2. A mount for supporting a load subject to vibration and shock, comprising a member to be fixed to said load and having axial movement, a supporting element adapted to be secured to a fixed support, a viscous damping fluid in said supporting element, a hollow element within said supporting element and attached to said member having axial movement and having an opening at one end thereof to permit entrance of said fluid into said hollow element, resilient material for interconnecting said hollow element and said supporting element, said hollow elements having a valve positioned therein, said valve element offering less resistance to the entrance of said viscous fluid from said supporting element into said hollow element than to the passage of said viscous fluid out of said hollow element.

3. A mount in accordance with claim 2, in which said valve includes tensioning means to control the providing of a predetermined resistance to the flow of said fluid into said hollow element.

4. A vibration mount, comprising a pair of members connectable to elements movable with respect to one another, one of said members being an outer hollow casing and the other of said members being an inner hollow and substantially closed shell, resilient material interconnecting portions of said members, a viscous fluid in said casing and in a portion of said shell, a portion of the fluid in said casing being forced into said shell upon movement of said shell into said casing and withdrawn from said shell upon movement of said shell out of said casing, and a valve in said shell, said valve being displaceable to offer less resistance to the entry of said fluid into said shell than to the exit of said fluid from said shell, said resilient material being a rubber ring having a Z-shaped cross-section.

5. A vibration mount, comprising a pair of members connectable to elements movable with respect to one another, one of said members being an outer hollow casing and the other of said members being an inner hollow shell with an opening therein, resilient material interconnecting portions of said members, a viscous fluid in said casing and in a portion of said shell, a disc element positioned in said shell and normally closing the opening in said shell, said disc element having openings therein, and means for applying pressure to said disc element, said disc element being urged against the pressure of said means when said members are moved toward one another.

ERNEST N. STORRS.

REFERENCES CITED

The following references are of record in the file of this patent:

UNITED STATES PATENTS

| Number | Name | Date |
|---|---|---|
| 2,387,066 | Harding | Oct. 16, 1945 |
| 2,421,585 | Thiry | June 3, 1947 |
| 2,457,749 | Thiry | Dec. 28, 1948 |